US010237067B2

(12) United States Patent
Malone

(10) Patent No.: US 10,237,067 B2
(45) Date of Patent: *Mar. 19, 2019

(54) APPARATUS FOR VOICE ASSISTANT, LOCATION TAGGING, MULTI-MEDIA CAPTURE, TRANSMISSION, SPEECH TO TEXT CONVERSION, PHOTO/VIDEO IMAGE/OBJECT RECOGNITION, CREATION OF SEARCHABLE METATAGS/CONTEXTUAL TAGS, STORAGE AND SEARCH RETRIEVAL

(71) Applicant: MYPORT TECHNOLOGIES, INC., McKinney, TX (US)

(72) Inventor: Michael F. Malone, McKinney, TX (US)

(73) Assignee: MyPort Technologies, Inc., McKinney, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/824,087

(22) Filed: Nov. 28, 2017

(65) Prior Publication Data

US 2018/0083779 A1 Mar. 22, 2018

Related U.S. Application Data

(63) Continuation of application No. 15/272,013, filed on Sep. 21, 2016, now Pat. No. 9,832,017, which is a
(Continued)

(51) Int. Cl.
*H04L 9/14* (2006.01)
*G06F 17/30* (2006.01)
(Continued)

(52) U.S. Cl.
CPC ............ *H04L 9/14* (2013.01); *G06F 17/3028* (2013.01); *G06F 17/30038* (2013.01);
(Continued)

(58) Field of Classification Search
USPC ................................................. 382/100, 305
See application file for complete search history.

(56) References Cited

U.S. PATENT DOCUMENTS

| 55,422 | A | 6/1866 | Roustaei |
| 2,950,971 | A | 8/1960 | Lewin |

(Continued)

FOREIGN PATENT DOCUMENTS

| EP | 0905966 | 3/1999 |
| EP | 1204277 | 5/2002 |

(Continued)

OTHER PUBLICATIONS

United States Patent and Trademark Office; Request for Ex Parte Reexamination in related re-exam application 90/013,265; dated Jun. 6, 2014; 1085 pages dated Jun. 6, 2014.
(Continued)

*Primary Examiner* — Ishrat I Sherali
(74) *Attorney, Agent, or Firm* — Gregory M. Howison

(57) ABSTRACT

This invention relates to a network interface device. A first capture device interfaces with a first external information source to capture first external information. A processor processes the captured first external information and stores it in a first media. The processor initiates the storage of the first captured information at an initial time and completes storage of the first captured information at a completion time, thus providing a stored defined set of first captured information. A transmitter transmits the defined set of stored captured information to a remote location on a network. A remote processing system is disposed at the remote node on the network and includes a database and a receiver for receiving the transmitted defined set of first captured information. A data converter is operable to convert the received defined set of first captured information to a second format.
(Continued)

The database stores the set of converted captured information.

17 Claims, 4 Drawing Sheets

Related U.S. Application Data continuation of application No. 14/660,166, filed on Mar. 17, 2015, which is a continuation of application No. 13/965,625, filed on Aug. 13, 2013, now Pat. No. 8,983,119, which is a continuation of application No. 13/417,229, filed on Mar. 10, 2012, now Pat. No. 8,509,477, which is a continuation of application No. 12/857,358, filed on Aug. 16, 2010, now Pat. No. 8,135,169, which is a continuation of application No. 11/621,062, filed on Jan. 8, 2007, now Pat. No. 7,778,438, which is a continuation-in-part of application No. 11/325,373, filed on Jan. 4, 2006, now Pat. No. 7,184,573, which is a continuation of application No. 10/674,910, filed on Sep. 29, 2003, now Pat. No. 6,996,251.

(60) Provisional application No. 60/757,075, filed on Jan. 6, 2006, provisional application No. 60/414,449, filed on Sep. 30, 2002.

(51) Int. Cl.
    *H04L 9/32* (2006.01)
    *H04N 5/76* (2006.01)
    *H04N 5/44* (2011.01)
    *H04N 21/258* (2011.01)
    *H04N 21/266* (2011.01)
    *H04N 21/2747* (2011.01)
    *H04N 21/41* (2011.01)
    *H04N 21/658* (2011.01)
    *H04N 21/835* (2011.01)
    *H04N 21/84* (2011.01)
    *H04N 5/77* (2006.01)
    *H04N 5/92* (2006.01)

(52) U.S. Cl.
    CPC .. *G06F 17/30244* (2013.01); *G06F 17/30268* (2013.01); *G06F 17/30749* (2013.01); *H04L 9/3263* (2013.01); *H04L 9/3271* (2013.01); *H04L 9/3297* (2013.01); *H04N 5/44* (2013.01); *H04N 5/76* (2013.01); *H04N 21/25816* (2013.01); *H04N 21/25875* (2013.01); *H04N 21/26603* (2013.01); *H04N 21/26613* (2013.01); *H04N 21/2747* (2013.01); *H04N 21/4108* (2013.01); *H04N 21/6582* (2013.01); *H04N 21/835* (2013.01); *H04N 21/84* (2013.01); *H04L 2209/60* (2013.01); *H04L 2209/80* (2013.01); *H04N 5/77* (2013.01); *H04N 5/9201* (2013.01)

(56) References Cited

U.S. PATENT DOCUMENTS

| | | |
|---|---|---|
| 3,439,598 A | 4/1969 | Weitzner et al. |
| 4,015,240 A | 3/1977 | Swonger et al. |
| 4,109,237 A | 8/1978 | Hill |
| 4,115,805 A | 9/1978 | Morton |
| 4,270,853 A | 6/1981 | Hatada et al. |
| 4,270,854 A | 6/1981 | Stemme et al. |
| 4,334,241 A | 6/1982 | Kashioka et al. |
| 4,344,682 A | 8/1982 | Hattori |
| 4,389,109 A | 6/1983 | Taniguchi et al. |
| 4,443,077 A | 4/1984 | Tanikawa |
| 4,528,588 A | 7/1985 | Lofberg |
| 4,574,319 A | 3/1986 | Konishi |
| 4,613,911 A | 9/1986 | Ohta |
| 4,620,318 A | 10/1986 | Hill |
| 4,642,717 A | 2/1987 | Matsuda et al. |
| 4,742,369 A | 5/1988 | Ishii et al. |
| 4,905,029 A | 2/1990 | Kelley |
| 4,951,079 A | 8/1990 | Hoshino et al. |
| 4,965,626 A | 10/1990 | Robison et al. |
| 4,977,419 A | 12/1990 | Wash et al. |
| 4,983,996 A | 1/1991 | Kinoshita |
| 4,994,831 A | 2/1991 | Marandi |
| 4,995,086 A | 2/1991 | Lilley et al. |
| 5,023,635 A | 6/1991 | Nealon |
| 5,025,283 A | 6/1991 | Robinson |
| 5,027,149 A | 6/1991 | Noshing et al. |
| 5,031,122 A | 7/1991 | Witty |
| 5,070,355 A | 12/1991 | Inoue et al. |
| 5,097,278 A | 3/1992 | Tamamura et al. |
| 5,099,262 A | 3/1992 | Tanaka et al. |
| 5,103,486 A | 4/1992 | Grippi |
| 5,128,700 A | 7/1992 | Inoue et al. |
| 5,142,310 A | 8/1992 | Taniguchi et al. |
| 5,146,249 A | 9/1992 | Hoda et al. |
| 5,160,952 A | 11/1992 | Iwashita et al. |
| 5,245,372 A | 9/1993 | Oashima |
| 5,247,300 A | 9/1993 | Sohn |
| 5,267,042 A | 11/1993 | Tsuchiya et al. |
| 5,276,472 A | 1/1994 | Bell et al. |
| 5,313,235 A | 5/1994 | Inoue et al. |
| 5,335,072 A | 8/1994 | Tanaka et al. |
| 5,410,598 A | 4/1995 | Shear |
| 5,426,745 A | 6/1995 | Baji et al. |
| 5,493,677 A | 2/1996 | Balogh et al. |
| 5,499,294 A | 3/1996 | Friedman |
| 5,502,576 A | 3/1996 | Ramsay et al. |
| 5,506,644 A | 4/1996 | Suzuki et al. |
| 5,515,042 A | 5/1996 | Nelson |
| 5,519,778 A | 5/1996 | Leighton et al. |
| 5,530,759 A | 6/1996 | Braudaway et al. |
| 5,546,145 A | 8/1996 | Bernardi et al. |
| 5,568,570 A | 10/1996 | Rabbani |
| 5,581,800 A | 12/1996 | Fardeau et al. |
| 5,602,458 A | 2/1997 | Dowe |
| 5,617,119 A | 4/1997 | Briggs et al. |
| 5,629,980 A | 5/1997 | Stefik |
| 5,633,678 A | 5/1997 | Parulski et al. |
| 5,642,285 A | 6/1997 | Woo et al. |
| 5,646,990 A | 7/1997 | Li |
| 5,646,997 A | 7/1997 | Bartson |
| 5,657,077 A | 8/1997 | DeAngelis et al. |
| 5,682,458 A | 10/1997 | Funazaki |
| 5,692,104 A | 11/1997 | Chow et al. |
| 5,692,225 A | 11/1997 | Bernardi et al. |
| 5,706,457 A | 1/1998 | Dwyer et al. |
| 5,712,679 A | 1/1998 | Coles |
| 5,726,660 A | 3/1998 | Purdy et al. |
| 5,732,354 A | 3/1998 | MacDonald |
| 5,737,491 A | 4/1998 | Allen et al. |
| 5,740,244 A | 4/1998 | Indeck et al. |
| 5,765,152 A | 6/1998 | Erickson |
| 5,767,496 A | 6/1998 | Swartz et al. |
| 5,768,640 A | 6/1998 | Takahashi et al. |
| 5,786,851 A | 7/1998 | Kondo et al. |
| 5,787,183 A | 7/1998 | Schroeder |
| 5,796,428 A | 8/1998 | Matsumoto et al. |
| 5,799,092 A | 8/1998 | Kristol et al. |
| 5,806,005 A | 9/1998 | Hull et al. |
| 5,815,201 A | 9/1998 | Hashimoto et al. |
| 5,819,289 A | 10/1998 | Sanford, II et al. |
| 5,822,432 A | 10/1998 | Moskowitz et al. |
| 5,825,890 A | 10/1998 | Elgamal et al. |
| 5,828,809 A | 10/1998 | Chang et al. |
| 5,835,667 A | 11/1998 | Wactlar et al. |
| 5,841,886 A | 11/1998 | Rhoads |
| 5,841,978 A | 11/1998 | Rhoads |
| 5,845,281 A | 12/1998 | Benson |

(56) References Cited

U.S. PATENT DOCUMENTS

| | | | |
|---|---|---|---|
| 5,857,038 A | 1/1999 | Owada et al. |
| 5,862,260 A | 1/1999 | Rhoads |
| 5,872,865 A | 2/1999 | Normile et al. |
| 5,889,578 A | 3/1999 | Jamzadeh |
| 5,892,900 A | 4/1999 | Ginter et al. |
| 5,893,095 A | 4/1999 | Jain et al. |
| 5,907,149 A | 5/1999 | Marckini |
| 5,913,078 A | 6/1999 | Kimura et al. |
| 5,923,327 A | 7/1999 | Smith et al. |
| 5,940,121 A | 8/1999 | McIntyre et al. |
| 5,943,422 A | 8/1999 | Van Wie et al. |
| 5,978,773 A | 11/1999 | Hudetz et al. |
| 5,991,876 A | 11/1999 | Johnson et al. |
| 5,995,630 A | 11/1999 | Borza |
| 5,995,936 A | 11/1999 | Brais et al. |
| 6,005,936 A | 12/1999 | Schimizu et al. |
| 6,014,183 A | 1/2000 | Hoang |
| 6,014,569 A | 1/2000 | Bottum |
| 6,023,241 A | 2/2000 | Clapper |
| 6,031,526 A | 2/2000 | Shipp |
| 6,064,764 A | 5/2000 | Bhaskaran et al. |
| 6,065,119 A | 5/2000 | Sandford, II et al. |
| 6,104,430 A | 8/2000 | Fukuoka |
| 6,111,605 A | 8/2000 | Suzuki |
| 6,115,137 A | 9/2000 | Ozawa et al. |
| 6,115,717 A | 9/2000 | Mehrotra et al. |
| 6,122,403 A | 9/2000 | Rhoads |
| 6,141,753 A | 10/2000 | Zhao et al. |
| 6,148,091 A | 11/2000 | Dimaria |
| 6,160,964 A | 12/2000 | Imoto |
| 6,166,729 A | 12/2000 | Acosta |
| 6,181,373 B1 | 1/2001 | Coles |
| 6,185,316 B1 | 2/2001 | Buffam |
| 6,185,683 B1 | 2/2001 | Ginter et al. |
| 6,198,989 B1 | 3/2001 | Tankhilevich et al. |
| 6,205,249 B1 | 3/2001 | Moskowitz |
| 6,208,746 B1 | 3/2001 | Musgrave |
| 6,212,401 B1 | 4/2001 | Ackley |
| 6,219,560 B1 | 4/2001 | Erkkila |
| 6,222,985 B1 | 4/2001 | Miyake |
| 6,233,684 B1 | 5/2001 | Stefik et al. |
| 6,243,480 B1 | 6/2001 | Zhao et al. |
| 6,243,481 B1 | 6/2001 | Tao |
| 6,269,446 B1 | 7/2001 | Schumacher et al. |
| 6,282,362 B1 | 8/2001 | Murphy et al. |
| 6,282,654 B1 | 8/2001 | Ikeda et al. |
| 6,292,092 B1 | 9/2001 | Chow et al. |
| 6,292,633 B1 | 9/2001 | Nakagawa |
| 6,300,880 B1 | 10/2001 | Sitnik |
| 6,301,368 B1 | 10/2001 | Bolle et al. |
| 6,321,981 B1 | 11/2001 | Ray et al. |
| 6,332,193 B1 | 12/2001 | Glass et al. |
| 6,334,187 B1 | 12/2001 | Kadono |
| 6,359,837 B1 | 3/2002 | Tsukamoto |
| 6,363,043 B1 | 3/2002 | Kondo |
| 6,366,680 B1 | 4/2002 | Brunk et al. |
| 6,377,699 B1 | 4/2002 | Musgrave et al. |
| 6,389,151 B1 | 5/2002 | Carr et al. |
| 6,389,538 B1 | 5/2002 | Gruse et al. |
| 6,397,334 B1 | 5/2002 | Chainer et al. |
| 6,411,328 B1 | 6/2002 | Franke et al. |
| 6,421,450 B2 | 7/2002 | Nakano |
| 6,424,968 B1 | 7/2002 | Broster et al. |
| 6,437,933 B1 | 8/2002 | Sugiyama et al. |
| 6,449,367 B2 | 9/2002 | Van Wie et al. |
| 6,462,778 B1 | 10/2002 | Abram et al. |
| 6,469,969 B2 | 10/2002 | Carson et al. |
| 6,491,217 B2 | 12/2002 | Catan |
| 6,498,586 B2 | 12/2002 | Pankinaho |
| 6,505,160 B1 | 1/2003 | Levy et al. |
| 6,507,371 B1 | 1/2003 | Hashimoto et al. |
| 6,525,768 B2 | 2/2003 | Obradovich |
| 6,526,215 B2 | 2/2003 | Hirai et al. |
| 6,526,351 B2 | 2/2003 | Whitham |
| 6,532,298 B1 | 3/2003 | Cambier et al. |
| 6,535,298 B2 | 3/2003 | Winter et al. |
| 6,560,339 B1 | 5/2003 | Iwamura |
| 6,560,660 B1 | 5/2003 | Flanagin |
| 6,571,271 B1 | 5/2003 | Savitzky et al. |
| 6,577,336 B2 | 6/2003 | Safai |
| 6,591,365 B1 | 7/2003 | Cookson |
| 6,606,117 B1 | 8/2003 | Windle |
| 6,611,607 B1 | 8/2003 | Davis et al. |
| 6,636,158 B1 | 10/2003 | Bando et al. |
| 6,636,249 B1 | 10/2003 | Rekimoto |
| 6,628,325 B1 | 12/2003 | Steinberg et al. |
| 6,670,984 B1 | 12/2003 | Tanaka et al. |
| 6,681,029 B1 | 1/2004 | Rhoads |
| 6,683,649 B1 | 1/2004 | Anderson |
| 6,687,383 B1 * | 2/2004 | Kanevsky ............ G10L 19/018 |
| | | 380/210 |
| 6,714,778 B2 | 3/2004 | Nykanen et al. |
| 6,720,879 B2 | 4/2004 | Edwards |
| 6,741,864 B2 | 5/2004 | Wilcock et al. |
| 6,747,692 B2 | 6/2004 | Patel et al. |
| 6,750,902 B1 | 6/2004 | Steinberg et al. |
| 6,786,397 B2 | 9/2004 | Silverbrook et al. |
| 6,788,800 B1 | 9/2004 | Carr et al. |
| 6,807,534 B1 | 10/2004 | Erickson |
| 6,831,682 B1 | 12/2004 | Silverbrook et al. |
| 6,833,861 B2 | 12/2004 | Matsumoto et al. |
| 6,853,987 B1 | 2/2005 | Cook |
| 6,856,344 B2 | 2/2005 | Franz |
| 6,889,324 B1 | 5/2005 | Kanai et al. |
| 6,895,126 B2 | 5/2005 | Di Bernardo et al. |
| 6,914,695 B2 | 7/2005 | Walters et al. |
| 6,947,571 B1 | 9/2005 | Rhoads et al. |
| 6,952,164 B2 | 10/2005 | Junqua |
| 6,956,671 B2 | 10/2005 | Monty et al. |
| 6,959,868 B2 | 11/2005 | Tsikos et al. |
| 6,965,324 B1 | 11/2005 | Suggs, Sr. |
| 6,968,366 B1 | 11/2005 | Zhang et al. |
| 6,968,453 B2 | 11/2005 | Doyle et al. |
| 6,990,444 B2 * | 1/2006 | Hind ................... G10L 21/06 |
| | | 704/235 |
| 6,996,251 B2 | 2/2006 | Malone et al. |
| 7,010,144 B1 | 3/2006 | Davis et al. |
| 7,016,899 B1 | 3/2006 | Stern et al. |
| 7,043,048 B1 * | 5/2006 | Ellingson ............ H04N 1/32101 |
| | | 382/100 |
| 7,053,938 B1 | 5/2006 | Sherry |
| 7,095,871 B2 | 8/2006 | Jones et al. |
| 7,184,573 B2 | 2/2007 | Malone et al. |
| RE39,526 E | 3/2007 | Hull et al. |
| 7,265,779 B2 | 9/2007 | Sato et al. |
| 7,319,484 B2 | 1/2008 | Yoshida et al. |
| 7,324,943 B2 | 1/2008 | Rigazio et al. |
| 7,391,960 B2 | 6/2008 | Shinozaki et al. |
| 7,617,542 B2 | 11/2009 | Vataja |
| 7,778,438 B2 * | 8/2010 | Malone ............ G06F 17/30038 |
| | | 382/100 |
| 7,778,440 B2 | 8/2010 | Malone |
| 7,831,598 B2 | 11/2010 | Ko |
| 7,907,199 B2 | 3/2011 | Seki et al. |
| 7,961,218 B2 | 6/2011 | Seki et al. |
| 8,068,638 B2 | 11/2011 | Malone |
| 8,099,772 B2 | 1/2012 | Takada et al. |
| 8,135,169 B2 | 3/2012 | Malone |
| 8,424,227 B2 | 4/2013 | Harrington |
| 8,509,477 B2 * | 8/2013 | Malone ............ G06F 17/30038 |
| | | 382/100 |
| 8,768,693 B2 * | 7/2014 | Somekh ............ G06F 17/30265 |
| | | 348/231.4 |
| 8,983,119 B2 * | 3/2015 | Malone ............ G06F 17/30038 |
| | | 382/100 |
| 9,471,592 B2 * | 10/2016 | Koyama ............ H04L 12/1831 |
| 9,832,017 B2 * | 11/2017 | Malone ................... H04L 9/14 |
| 2001/0007130 A1 | 7/2001 | Takaragi |
| 2001/0011680 A1 | 8/2001 | Soltesz et al. |
| 2001/0012062 A1 | 8/2001 | Anderson |
| 2001/0012066 A1 | 8/2001 | Parulski et al. |
| 2001/0015759 A1 | 8/2001 | Squibbs |
| 2001/0018349 A1 | 8/2001 | Kinnunen et al. |
| 2001/0021144 A1 | 9/2001 | Oshima et al. |

(56) References Cited

U.S. PATENT DOCUMENTS

| | | |
|---|---|---|
| 2001/0021978 A1 | 9/2001 | Okayasu et al. |
| 2001/0025342 A1 | 9/2001 | Uchida |
| 2001/0034835 A1 | 10/2001 | Smith |
| 2001/0044824 A1 | 11/2001 | Hunter et al. |
| 2002/0001395 A1 | 1/2002 | Davis et al. |
| 2002/0010684 A1 | 1/2002 | Moskowitz |
| 2002/0015042 A1 | 2/2002 | Robotham et al. |
| 2002/0030907 A1 | 3/2002 | Ikeda et al. |
| 2002/0031240 A1 | 3/2002 | Levy et al. |
| 2002/0032502 A1 | 3/2002 | Russell |
| 2002/0033844 A1 | 3/2002 | Levy et al. |
| 2002/0046188 A1 | 4/2002 | Burges et al. |
| 2002/0051577 A1 | 5/2002 | Kinjo |
| 2002/0059162 A1 | 5/2002 | Shinoda et al. |
| 2002/0061120 A1 | 5/2002 | Carr et al. |
| 2002/0062382 A1 | 5/2002 | Rhoads et al. |
| 2002/0072935 A1 | 6/2002 | Rowse et al. |
| 2002/0073056 A1 | 6/2002 | Broster et al. |
| 2002/0075298 A1 | 6/2002 | Schena et al. |
| 2002/0080271 A1 | 6/2002 | Eveleens et al. |
| 2002/0080396 A1 | 6/2002 | Silverbrook et al. |
| 2002/0080964 A1 | 6/2002 | Stone et al. |
| 2002/0083123 A1 | 6/2002 | Freedman et al. |
| 2002/0102966 A1 | 8/2002 | Lev et al. |
| 2002/0146148 A1 | 10/2002 | Levy |
| 2002/0152388 A1 | 10/2002 | Linnartz et al. |
| 2002/0191087 A1 | 12/2002 | Hashimoto et al. |
| 2002/0194480 A1 | 12/2002 | Nagao |
| 2003/0011684 A1 | 1/2003 | Narayanaswami et al. |
| 2003/0032033 A1 | 2/2003 | Anglin et al. |
| 2003/0048921 A1 | 3/2003 | Cahall |
| 2003/0177094 A1 | 9/2003 | Needham et al. |
| 2003/0187950 A1 | 10/2003 | Rising, III |
| 2004/0005078 A1 | 1/2004 | Tillotson |
| 2004/0022444 A1 | 2/2004 | Rhoads |
| 2004/0023686 A1 | 2/2004 | King et al. |
| 2004/0032499 A1 | 2/2004 | Silverbrook et al. |
| 2004/0039930 A1 | 2/2004 | Ohmori et al. |
| 2004/0044911 A1 | 3/2004 | Takada |
| 2004/0049734 A1 | 3/2004 | Simske |
| 2004/0053637 A1 | 3/2004 | Iida |
| 2004/0068371 A1 | 4/2004 | Estep |
| 2004/0070670 A1 | 4/2004 | Foster |
| 2004/0073557 A1 | 4/2004 | Piccionelli et al. |
| 2004/0073568 A1 | 4/2004 | Yonaha |
| 2004/0085203 A1 | 5/2004 | Junqua |
| 2004/0091111 A1 | 5/2004 | Levy et al. |
| 2004/0101138 A1 | 5/2004 | Revital et al. |
| 2004/0103283 A1 | 5/2004 | Homak |
| 2004/0109199 A1 | 6/2004 | Tsubaki |
| 2004/0114042 A1 | 6/2004 | Paolini et al. |
| 2004/0148518 A1 | 7/2004 | Grundback et al. |
| 2004/0183915 A1 | 9/2004 | Gotohda et al. |
| 2004/0197013 A1 | 10/2004 | Kamei |
| 2004/0203386 A1 | 10/2004 | Tischer et al. |
| 2004/0257431 A1 | 12/2004 | Girish et al. |
| 2005/0024493 A1 | 2/2005 | Nam |
| 2005/0041035 A1 | 2/2005 | Nagatomo et al. |
| 2005/0043018 A1 | 2/2005 | Kawamoto |
| 2005/0091311 A1 | 4/2005 | Lund et al. |
| 2005/0094000 A1 | 5/2005 | Son et al. |
| 2005/0134703 A1 | 6/2005 | Mittal |
| 2005/0143136 A1 | 6/2005 | Lev et al. |
| 2005/0185049 A1 | 8/2005 | Iwai et al. |
| 2005/0216580 A1 | 9/2005 | Raji et al. |
| 2005/0216949 A1 | 9/2005 | Candelora et al. |
| 2005/0219359 A1 | 10/2005 | Trela |
| 2005/0231752 A1 | 10/2005 | Sainio |
| 2006/0018506 A1 | 1/2006 | Rodriguez et al. |
| 2007/0055689 A1 | 3/2007 | Rhoads et al. |
| 2007/0098172 A1 | 5/2007 | Levy et al. |
| 2007/0250526 A1 | 10/2007 | Hanna |

FOREIGN PATENT DOCUMENTS

| | | |
|---|---|---|
| WO | 9603286 | 2/1996 |
| WO | 9626494 | 8/1996 |
| WO | 9743736 | 11/1997 |
| WO | 9827510 | 6/1998 |
| WO | 9901859 | 1/1999 |
| WO | 9936876 | 7/1999 |
| WO | 0036605 | 6/2000 |
| WO | 0070585 | 11/2000 |
| WO | 0115021 | 3/2001 |
| WO | 0152178 | 7/2001 |
| WO | 0161508 | 8/2001 |
| WO | 0167707 | 9/2001 |
| WO | 0173586 | 10/2001 |
| WO | 0175629 | 10/2001 |
| WO | 0197128 | 12/2001 |
| WO | 0211446 | 2/2002 |

OTHER PUBLICATIONS

United States Patent and Trademark Office; Request for Ex Parte Reexamination in related re-exam application 90/013,255; dated May 27, 2014; 906 pages dated May 27, 2014.

United States Patent and Trademark Office; Request for Ex Parte Reexamination in related re-exam application 90/013,265; dated Feb. 16, 2015; 187 pages dated Feb. 16, 2015.

United States Patent and Trademark Office; Request for Ex Parte Reexamination in related re-exam application 90/013,255; dated Mar. 2, 2015; 177 pages Mar. 2, 2015.

H. Krawczyk, RFC 2104 (RFC2104) RFC 2104—HMAC: Keyed-Hashing for Message Authentication https://www.faqs.org/rfcs/rfc2104.htm, Feb. 1997.

G. Friedman, "The Trustworthy Digital Camera: Restoring Credibility to The Photographic Image," IEEE Transactions on Consumer Electronics, pp. 905-910, vol. 39, No. 4, Nov. 1993.

Franks, et al., "HTTP Authentication: Basic and Digest Access Authentication," The Internet Society, Jun. 1999.

Franks, et al., "An Extension to HTTP: Digest Access Authentication," The Internet Society, Jan. 1997.

Supplemental First Amended Complaint, *MyPort IP, Inc.* v. *HTC Corporation*, Civil Action No. 6:11-cv-00246 (E.D. Tex. Filed Mar. 8, 2012) ("MyPort Complaint"), 12 pages. Mar. 8, 2012.

Digital Still Camera Image File Format Standard (Exchangeable image file format for Digital Still Cameras: Exif), Version 2.1, published Jun. 12, 1998 by the Japan Electronic Industry Development Association (JEIDA) ("Exif 2.1 Specification"), 173 pages.

TIFF Specification Revision 6.0, Aldus Developers Desk, Aldus Corporation, Jun. 3, 1992.

James Bao-Yen Tsui, Fundamental of Global Positioning System Receivers: A Software Approach, pp. 1-6, 73-108, 1983-2217 (John Wiley & Sons, Inc. 2000).

PPP Encryption Control Protocol, Internet Engineering Task Force (IETF), published Jun. 1996.

Alfred Menezes, Paul C. van Oorschot, and Scott A. Vanstone, Handbook of Applied Cryptography (CRC Press 1996).

MyPort IP, Inc.'s Disclosure Pursuant to Patent Rule 3-1, *MyPort IP, Inc.* v. *HTC Corporation*, Civil Action No. 6:11-cv-00246 (E.D. Tex. Filed May 13, 2011).

Stansell, Jr., "Civil GPS from a Future Perspective," Proceedings of the IEEE, Oct. 1983, vol. 71, No. 10; pp. 1187-1192. Oct. 1, 1983.

Dale, Diana & Rog, Ron, The Need for a Meta-Tag Standard for Audio and Visual Materials, Proc. Int. Conf. on Dublin Core and Metadata for e-Communities 2002: 205-206. Jan. 1, 2002.

Kosovic, Douglas; Schroeter, Ronald; and Hunter, Jane, Collaborative Video Annotation, Indexing and Discussion over high-bandwidth networks, DSTC Technical Report TR247, 2002, DSTC Pty Ltd., St Lucia, Qld, Australia. Jan. 1, 2002.

\* cited by examiner

APPARATUS FOR VOICE ASSISTANT, LOCATION TAGGING, MULTI-MEDIA CAPTURE, TRANSMISSION, SPEECH TO TEXT CONVERSION, PHOTO/VIDEO IMAGE/OBJECT RECOGNITION, CREATION OF SEARCHABLE METATAGS/CONTEXTUAL TAGS, STORAGE AND SEARCH RETRIEVAL

CROSS-REFERENCE TO RELATED APPLICATIONS

This application is a Continuation of U.S. patent application Ser. No. 15/272,013, filed on Sep. 21, 2016, entitled APPARATUS FOR PERSONAL VOICE ASSISTANT, LOCATION SERVICES, MULTI-MEDIA CAPTURE, TRANSMISSION, SPEECH TO TEXT CONVERSION, PHOTO/VIDEO IMAGE/OBJECT RECOGNITION, CREATION OF SEARCHABLE METATAG(S)/CONTEXTUAL TAG(S), STORAGE AND SEARCH RETRIEVAL, now U.S. Pat. No. 9,832,017, issued Nov. 28, 2017. Application Ser. No. 15/272,013 is a continuation of U.S. application Ser. No. 14/660,166, filed Mar. 17, 2015, and entitled METHOD FOR PERSONAL VOICE ASSISTANT, LOCATION SERVICES, MULTI-MEDIA CAPTURE, TRANSMISSION, SPEECH CONVERSION, METATAGS CREATION, STORAGE AND SEARCH RETRIEVAL. U.S. application Ser. No. 14/660,166 is a Continuation of U.S. patent application Ser. No. 13/965,625, filed Aug. 13, 2013, and entitled METHOD FOR VOICE COMMAND ACTIVATION, MULTI-MEDIA CAPTURE, TRANSMISSION, SPEECH CONVERSION, METATAGS CREATION, STORAGE AND SEARCH RETRIEVAL, now U.S. Pat. No. 8,983,119, issued on Mar. 17, 2015. U.S. patent application Ser. No. 13/965,625 is a Continuation of U.S. patent application Ser. No. 13/417,229, filed on Mar. 10, 2012, and entitled METHOD FOR MULTI-MEDIA CAPTURE, TRANSMISSION, CONVERSION, METATAGS CREATION, STORAGE AND SEARCH RETRIEVAL, now U.S. Pat. No. 8,509,477, issued on Aug. 13, 2013, the specifications of which are incorporated herein by reference.

U.S. patent application Ser. No. 13/417,229 is a Continuation of U.S. patent application Ser. No. 12/857,358, filed on Aug. 16, 2010, and entitled METHOD FOR MULTI-MEDIA CONVERSION, METATAGS CREATION, STORAGE AND SEARCH RETRIEVAL, published as U.S. Patent Application Publication No. US 2010/0303288, now U.S. Pat. No. 8,135,169, issued on Mar. 13, 2012. U.S. Patent Application Publication No. 2010/0303288 and U.S. Pat. No. 8,135,169 are incorporated by reference herein.

U.S. patent application Ser. No. 12/857,358 is a Continuation of U.S. patent application Ser. No. 11/621,062, filed on Jan. 8, 2007, and entitled METHOD FOR MULTI-MEDIA RECOGNITION, DATA CONVERSION, CREATION OF METATAGS, STORAGE AND SEARCH RETRIEVAL, published as U.S. Patent Application Publication No. U.S. 2007/0150517, now U.S. Pat. No. 7,778,438, issued on Aug. 17, 2010. U.S. Patent Application Publication No. U.S. 2007/0150517 and U.S. Pat. No. 7,778,438 are incorporated by reference herein.

U.S. patent application Ser. No. 11/621,062 is a Continuation-in-Part of U.S. patent application Ser. No. 11/325,373, filed Jan. 4, 2006, and entitled APPARATUS FOR CAPTURING INFORMATION AS A FILE AND ENHANCING THE FILE WITH EMBEDDED INFORMATION, published as U.S. Patent Application Publication No. U.S. 2006/0115111, now U.S. Pat. No. 7,184,573, issued Feb. 27, 2007. Application Ser. No. 11/621,062 claims benefit of U.S. Provisional Application No. 60/757,075, filed on Jan. 6, 2006, and entitled APPARATUS AND METHOD FOR EMBEDDING META-TAGS INTO MEDIA FILES. U.S. Patent Application Publication No. U.S. 2006/0115111 and U.S. Pat. No. 7,184,573 are incorporated by reference herein.

U.S. patent application Ser. No. 11/325,373 is a Continuation of U.S. patent application Ser. No. 10/674,910, filed Sep. 29, 2003, and entitled FORENSIC COMMUNICATION APPARATUS AND METHOD, published as U.S. Patent Application Publication No. U.S. 2004/0125208, now U.S. Pat. No. 6,996,251, issued on Feb. 7, 2006. Application Ser. No. 10/674,910 claims benefit of U.S. Provisional Application No. 60/414,449, filed Sep. 30, 2002, and entitled FORENSIC COMMUNICATION APPARATUS AND METHOD. U.S. Patent Application Publication No. U.S. 2004/0125208, U.S. Pat. No. 6,996,251, and U.S. Application No. 60/414,449 are incorporated by reference herein.

TECHNICAL FIELD

This invention relates to the storage and search retrieval of all types of digital media files, whether music or other audio, still photographs, videos, movies or other types of media.

BACKGROUND

The popularity of digital media devices such as digital cameras, video cameras, mobile phones with audio and video recording capability and portable music devices that have recording capability has exploded in recent years. Instead of recording pictures, video and sound on physical media, modern devices record to rewritable memory devices. This means that the cost to create a new image, movie or audio recording has fallen to near zero, making the number of these recordings available in any given individual's library skyrocket.

But this new ability to store virtually unlimited numbers of media files introduces new problems. First, the sheer number makes it nearly impossible to manually describe and index every media file in one's possession. This means that, for many, photographs, movies and audio recordings are kept in poorly organized computer files and finding any particular picture, movie or recording is a difficult and time-consuming process.

The second problem is the fact that people typically trade up to a new computer every three years or so. This means that hours of video, thousands of pictures or hundreds of audio files must be transferred from the old system to the new—a sometimes daunting task.

A third problem is one can typically access locally stored media files only on the computer on which they reside. If one wishes to share the file with another one must typically employ some file-transfer method ahead of time (email, FTP, public server, etc.)

A fourth problem relates to e-mailing or sending your media files to another party, whereas the receiving party is not able to search the media files for the specific key indexes that the original owner had intended. While there are programs to allow the originator to type in key index words (tags) for searching and retrieving these media files from their personal computer, when these media files are e-mailed or sent to another party, these tags are removed from the media file, therefore the receiving party does not have an ability to search, sort, display, play or print these media files based on the original owners key indexes.

Finally, those who make a living providing content need some method for proving that a given work belongs to them, and that they are the original creator of the work.

SUMMARY

The present invention disclosed and claimed in one aspect thereof a system for capturing data in a first media and storing in a database at a remote location on a network. A network interface device is provided having a first capture device interfacing with a first external information source that generates external information and capturing the first external information during generation thereof. A processor is provided for processing the captured first external information and storing it in a first media format as stored first captured information within the network interface device, the processor initiating the storage of the first captured information as stored first captured information at an initial time and completes storage of the first captured information as stored first captured information at a completion time, thus providing a stored defined set of first captured information representing the first captured information between the initial time and the completion time. A transmitter is provided for transmitting as a transmitted defined set of first captured information the defined set of stored captured information to a remote location on a network after the completion time. A remote processing system is disposed at the remote node on the network and includes a database and a receiver for receiving the transmitted defined set of first captured information from the transmitter associated with the network interface device as a received defined set of first captured information. A data converter is operable to convert the received defined set of first captured information to a second format as a set of converted first captured information, the second format different than the first media format, the second format being a searchable format. The database then stores the set of converted captured information.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION

Figure 1:
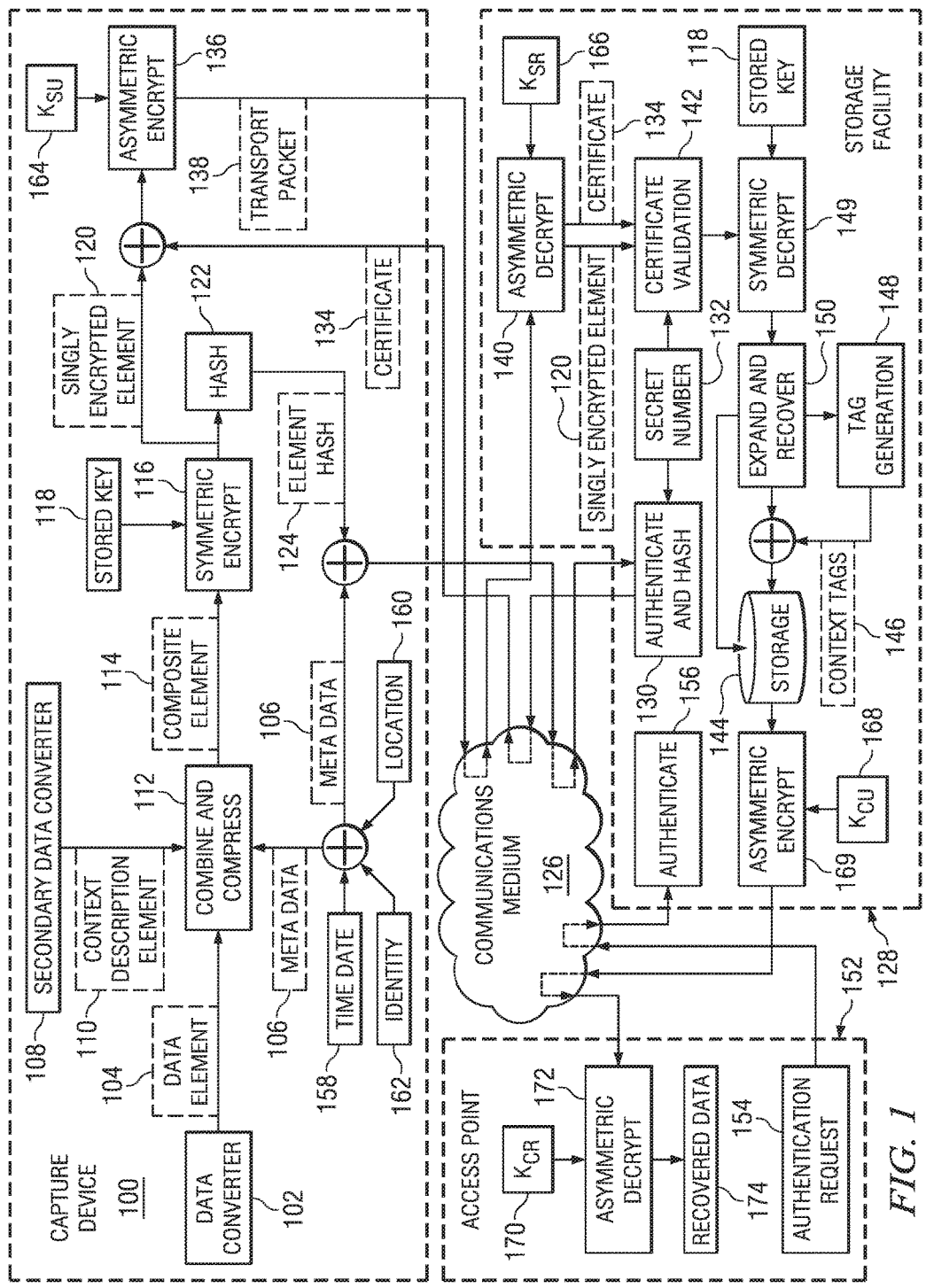
FIG. 1 illustrates a block diagram of the overall operation of the system in accordance with the present disclosure.

Referring now to FIG. 1, there is illustrated a block diagram of the overall operation of the system in accordance with the present disclosure. The invention is best described by beginning with the capture device 100.

Still pictures, moving pictures, audio, telemetry or other information (hereafter called simply, "information") is gathered by the data converter 102 and organized into one "data element" 104 consisting of a single picture, a movie/video clip, an audio clip, a sample of telemetry data or other logical grouping of related information. The data converter 102 can be any type of data capture information. For pictures, a digital camera can be utilized and, for movie/video clips, the data converter can be a digital video recorder (DVR). In general, the data converter is any type of device that will capture the information and place it in some type of digitized format. As will be understood and discussed herein below, this digitized format is typically native to the data converter and the manufacturer. Some manufacturers have a particular file format in which they generate the information. This file format may have a designator as to the user, a sequence number or time stamp.

At the same time the data element is created by the capture device 100, certain other data ("meta data") 106 is captured as well. This meta data may include time and date 158, location 160, operator identification 162, or other information deemed relevant to establish the context of the data element. The time, date and location may be taken from a GPS unit, or may be derived by time-domain analysis of certain types of mobile phone signals or wireless network domains.

In some embodiments of this invention, it may be desirable to use a technique known as steganography to permanently and indelibly embed the meta data directly into the data element. By using one of several well-known steganographic techniques, the data element can be subtly altered such that 1) it is difficult to determine that hidden information is stored in the data element, and 2 even if it is known that hidden information is stored in the data element, retrieval without some secret information (a "key") is difficult. In this way, the data element can be guaranteed authentic even if stripped from external meta data.

Also, at the time of information capture, the capture device may gather additional information from the operator by means of a secondary data converter 108 that relates to defining the context of the data element. For example, after a camera/video recorder takes a picture/video, a microphone (the secondary data converter) might capture the audio describing the image or the audio from the video just captured. This "context description element" 110 is stored along with the data element and the meta data.

At this point, the capture device 100 has in its internal temporary storage the data element, the meta data and optionally the context description element. It now creates a composite data set using one of a number of well-known algorithms for combining multiple data sets into a single data set. For example, the well-known ZIP compression algorithm routinely performs statistical compression on a number of input files and creates a single output file such that, with the proper decompression algorithm, the original set of files can be recovered without data loss. This "combine and compress" function 112 creates a data set called the "composite element." 114.

The capture device now encrypts the composite element using any of a number of well-known encryption algorithms. In the preferred embodiment, the composite element is first encrypted using a symmetrical cryptosystem 116 using a key 118 shared by the capture device and the storage facility. The resulting "singly-encrypted element" 120 is then hashed. "Hashing" 122 is a technique that generates a digital "signature" for a data set, such that any party wishing to verify the correctness of the data set can easily recalculate the hash and compares it with the previously calculated hash. Hash algorithms have the further property that it is computationally difficult to find multiple data sets that have the same hash value. This calculated hash value ("element hash") 124 becomes part of the meta data set that is to be associated with the data element.

It is now necessary for the capture device to contact the storage facility over some communications medium. This communications medium 126 can be any mechanism that permits near real-time, two-way communication. The specifics of the communication medium are not disclosed here, but could comprise a wireless telephone network, the public switched telephone network, or the Internet. The capture device sends the meta data 106 (now consisting of the time, date, operator identification, image, video, audio, "context description element" 110, hash 122 and possibly other data) to the storage facility 128.

The storage facility validates the meta data received from the capture device and, if authorized, combines and hashes 130 the received meta data and a secret number 132 known only to the storage facility. This hash is appended to the original meta data set and is then returned to the capture device as a "certificate." 134 At a later time, the certificate can be presented to the storage facility to determine if a data element is authentic.

The singly encrypted element 120 is now combined with the certificate 134 and then is further encrypted using an asymmetrical cryptosystem 136 under the public encryption key 164 of the storage facility 128, designated $K_{SU}$. This new packet (the "transport packet") 138 is now ready to transmit to the storage facility 128.

When it receives the transport packet 138, the storage facility 128 first decrypts 140 the packet 138 using its private decryption key 166 designated as $K_{SR}$. This gives the storage facility 128 access to the certificate 134 (which contains the meta data 106). The certificate can be validated 142 by rehashing the meta data 106 and the secret number 132. Unpacking the certificate 134, the storage facility 128 now knows the identity of the capture device 100, and can use this to retrieve the secret, symmetrical key 118 under which the singly encrypted element 120 is encrypted. The storage facility 128 now decrypts 149) the singly encrypted element 120 to retrieve the composite element 114; then expands and recovers 150 the composite element to retrieve the data element 104, the meta data 106, and the context description element 110, if present.

Now, the storage facility 128 can store the data element 104 under the owner's account in its mass storage 144. The storage facility knows the owner's identity because it was disclosed in the meta data 106. The storage facility also adds "context tags" 146 by methods dependent on the type of data that is being stored.

Context tags 146 are searchable elements derived from either the data element 104 itself or from the context description element 110. For example, if the data element 104 is a still photograph or video, the storage facility may create context tags that describe elements of the scene or image(s), such as "animal," or "dog," or "Spot," depending on the mechanism that converts the information in the data element or the context description element into a tag.

It is equipment analyze the data elements (photograph, movie, audio recording, etc.) and create 148 a set of appropriate tags. For audio files, this may include a speech-to-text algorithm; for still or moving images, it may include image recognition and identification. Whatever the method used, at the end of the process the set of data to store includes the data element 102, the context element 110, and meta data 106 that now includes a set of searchable tags specific to that image, video, audio or other media. 146, presumed that, as image and voice recognition improve; this task can be fully automated. Therefore, the preferred embodiment of this invention is to have the task automated.

Retrieval of the data elements is performed from some access point 152 remote from the storage facility 128. To retrieve data elements, a client must prove to the storage facility that the client is authorized to access the desired data element. This can be done in any number of ways, but in the preferred embodiment of the invention, it is a password challenge. The access point 152 creates an authentication request 154 and transmits the request via the communications medium 126 to the storage facility 128. At the storage facility, the request is authenticated 156. Once the challenge has been successfully met, the client can access the data elements belonging to it. Details of the authentication process may include password authentication, a challenge/response protocol, or may employ a hardware authentication device.

Once the request for information has been authenticated, the storage facility 128 reads the requested information from the bulk storage device 144 and encrypts 169) under the public key of the requester 168, designated as $K_{CU}$. The encrypted data is then transmitted to the client over the communications medium 126. Upon arrival, the message is decrypted 172 under the client's private key 170 designated as $K_{CR}$ and the data 174 is recovered.

Once the data has been retrieved, the tags may be edited or removed and new tags added. Other meta data; particularly location and time and date cannot be changed.

Variations of the system include placing the ability to enter tags on the data capture device itself. This could be in the form of a keypad, a touch screen or voice recognition software. If this option were taken, the data packet from the image capture device would include the tags in the meta data rather than a context description element.

Another variation applies to highly secure applications in which it is desirable to keep the data element 104 encrypted even while at the storage facility. In this variation, the data element 104 is encrypted under a symmetrical cryptosystem prior to combination with the meta data 106 and the context description element 110. This variation precludes the automatic extraction of tags from the data element itself, but still permits tagging based on the context description element.

Figure 2:
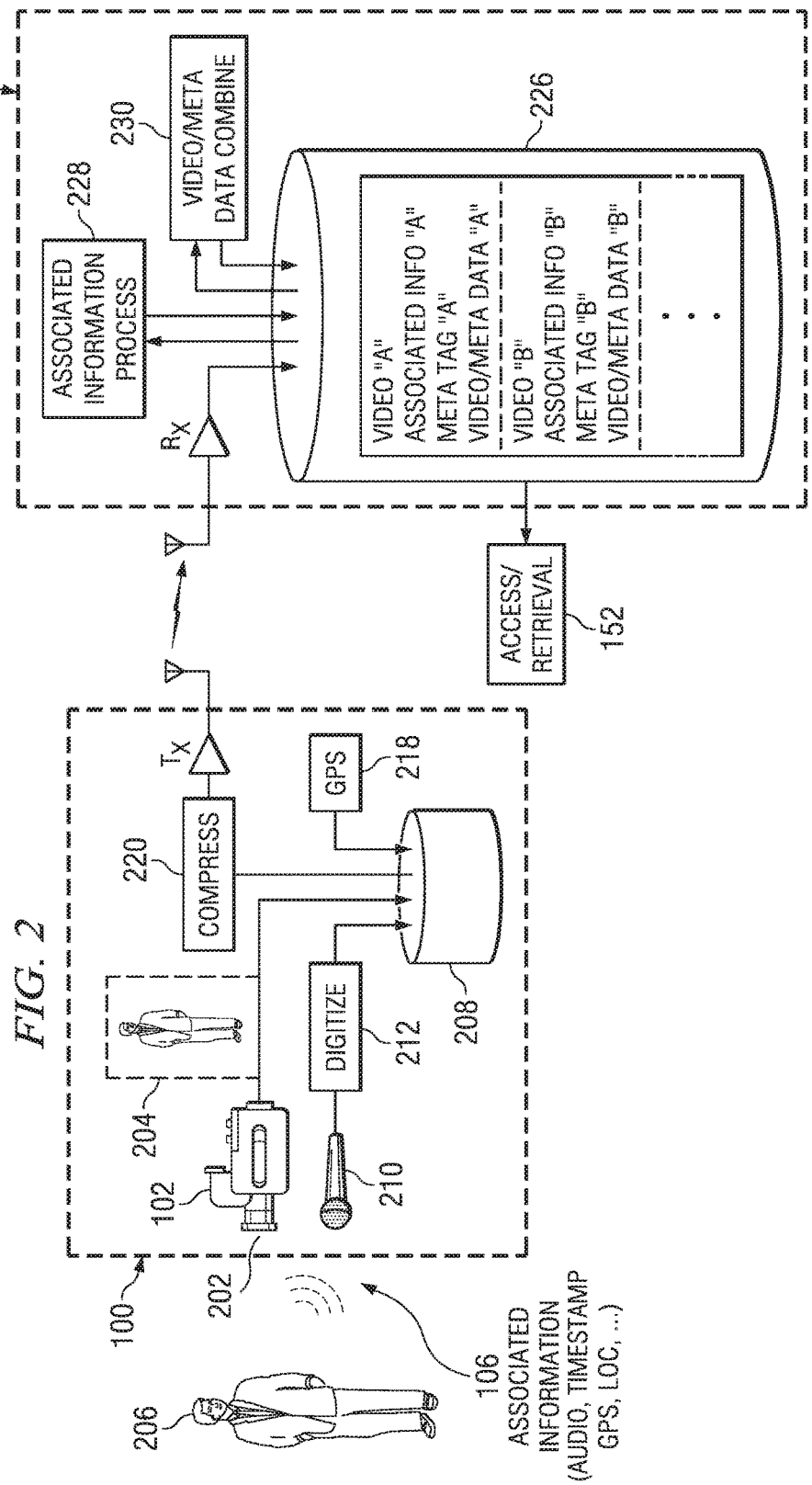
FIG. 2 illustrates a block diagram of one embodiment of the overall operation of the system in accordance with the present disclosure.

Referring now to FIG. 2, there is illustrated a diagrammatic view of the overall operation of the system. In this system, the capture device 100 is disclosed wherein the actual device that captured it, the device 102, is illustrated as being a digital camera. This has a lens 202 associated therewith, with the output of the camera being a digitized image 204. This is basically the data element 104 of FIG. 1. It can be seen that the element 204 is in a digitized format that is typically native to the camera. This can be any type of video capture element for capturing an image 206.

Once the image is captured, it is stored in a data base 208. In addition to this information, various associated information such as audio, timestamp, GPS, location, etc. can be collected. One method for collecting the audio information, for example, is to utilize a microphone 210 that will capture the information and then digitize it in a digitizing block 212 utilizing an analog-to-digital converter, for example. This not only converts it to a digital value but, further, will convert it to a particular audio format such as a *.WAV file format. This particular file format is stored in the database 208. Of course, any other type of digital format could be utilized that is consistent with an audio format. The GPS information for location can be collected with an external GPS system 218 and timestamp information can internally be generated.

After all the information regarding the video information and the audio information, for example, is collected, it is stored in the database 208 and then must be output therefrom. In this embodiment, there are two types of attached information that are to be embedded within the image at a later time. The first set of information is the GPS information, the timestamp information, etc., that is collected automatically with any image. This information is created in a temporal relationship with respect to that particular image at the time of the capture of the image information. This location information, timestamp information, etc., is information that is unique to the photograph and defines that image. Further, user information can be provided which defines the user information that is associated with the capture device, i.e., the camera. The additional information, the audio information, is provided in the form of comments and the such which can be stored. Therefore, when the data in the form of the image information is to be transmitted to the remote site, it is combined with the additional GPS, location, timestamp, etc., information and the audio input information.

There is typically provided a unique file format that defines the digital image and this unique file name can be utilized to define all of the secondary information such that there is a unique association of that information with the image. Thereafter, a compress module 220 is provided for compressing the information in a compressed file format such as a *.ZIP file format. This is just a manner to transmit a number of files together. However, at the reception point, when the files are extracted from this *.ZIP file, there must be some way to distinguish the files and again associate them. This is done, for example, with a unique file naming structure. However, there could be other techniques utilized to uniquely identify the association between these different files.

Once this compressed file format is transmitted to the storage facility 128, it is stored in a database 226. At this time there will be, for example, a video clip or a video image (such as a still image) stored in association with the various information that is associated therewith. This, in effect, is a relational database that provides data storage in close association with each other. The first thing that must be done is to extract the information from the data. This is done in a block 228 wherein the associated information is extracted from the database, this being the associated information, and then processed. Typically, the associated information will be the audio information in the audio file format. This must be converted. One conversion that is provided for is to convert the audio formatted data to text data. Therefore, one type of audio-to-text converter can be a voice translation system. There are many of these that are provided such as the Dragon Naturally Speaking systems.

Once the text format has been provided, this is converted to intermediate formatted data, i.e., text data, that can then be processed in a format that can be embedded within a video file or an image file. This can then be converted into HTML data or other data. This will typically be formatted such that it can be defined as a meta tag for association with the video image. This meta tag is then combined with the image in a block 230. Once combined, this will then be stored in the database in association with the original raw video and raw audio files. Thereafter, there is an access and retrieval block 152 that can allow one to access the particular modified or "tagged" image via a search. There can be provided a search algorithm that searches all of the tagged images. This searching can be performed based upon the GPS location information, the timestamp information, the added audio comment information, etc. Any information that can be provided over and above the video information that was provided in all of the associated information at the camera can then be searched, as this is the information that is contained in the appended information to the image.

Figure 3:
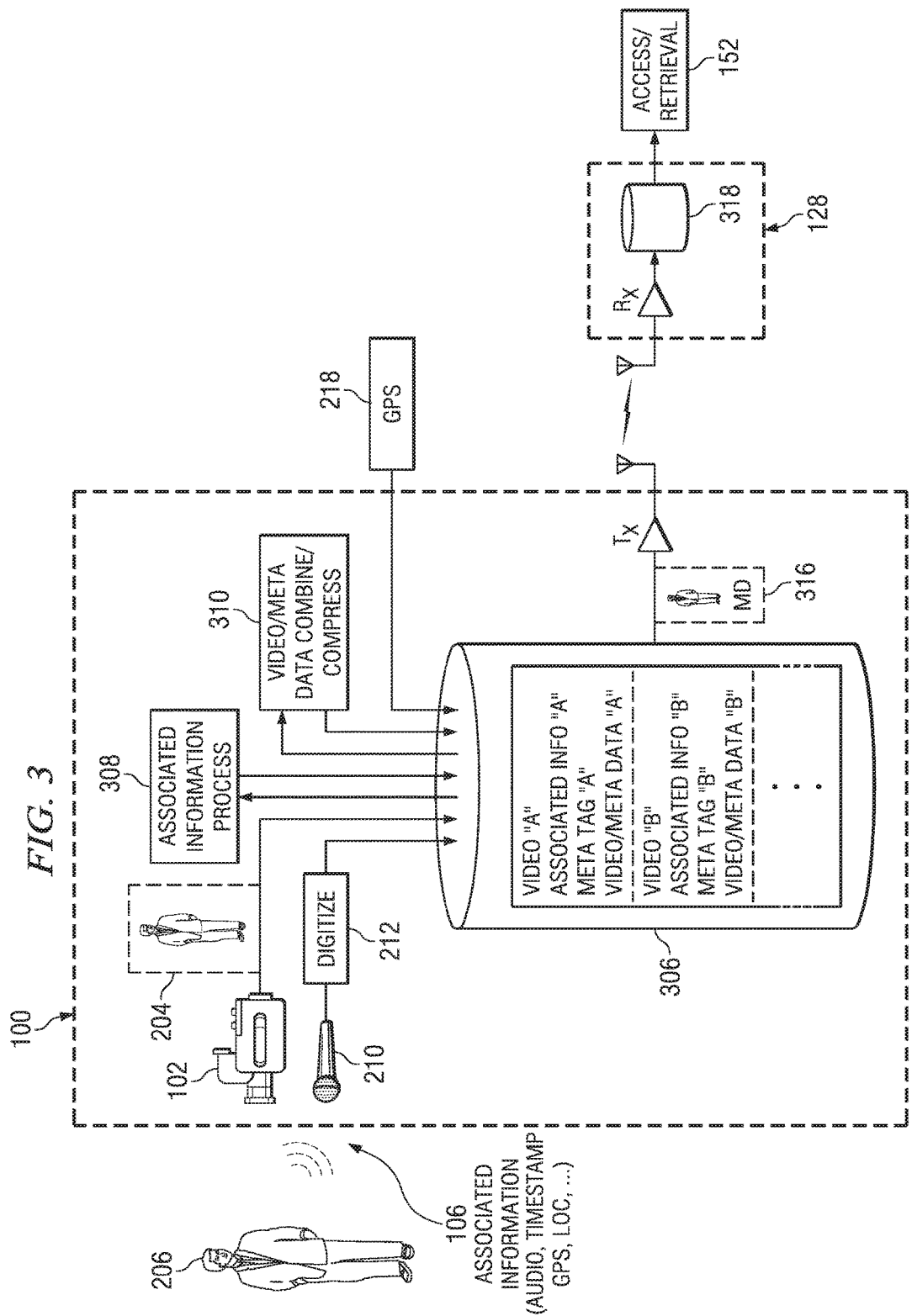
FIG. 3 illustrates a block diagram of another embodiment of the overall operation of the system in accordance with the present disclosure.

Referring now to FIG. 3, there is illustrated an alternate embodiment wherein substantially all of the combining operation is contained within the capture device 100 or the camera. Again, there is provided the capture device 102 in the form of the camera that captures the image 206. This is converted and stored in a database 306. The database 306 is basically the combination of database 208 and the database 226. Initially, all of the information from the digital video image 204 and the audio information and all other associated information such as the GPS information, timestamp, etc., are all stored in the database 306. There will be a corresponding process 308 for taking the associated information and converting it into different information, i.e., a meta tag, which is substantially the same as the process 228. Once the associated process is combined it is converted into that format, then it can be combined with the image in a process block 310, similar to the process block 230. Once this occurs, then there is provided a combined video/image with meta data that can be transmitted. This is illustrated as the augmented image 316 which has meta data associated therewith. This is transmitted for storage at the storage facility in a database 318. This is searchable through the access/retrieval process 152, as described herein above.

Figure 4:
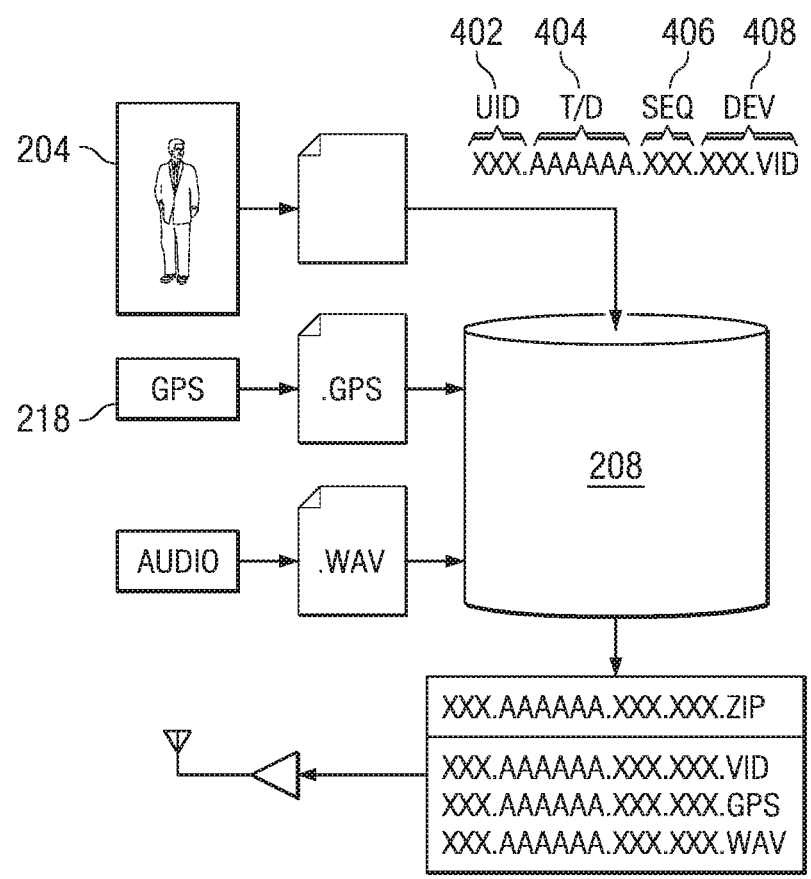
FIG. 4 illustrates a block diagram of the file management of the system in accordance with the present disclosure.

Referring now to FIG. 4, there is illustrated one exemplary embodiment of the file structure. The image 204 is a digitized image that constitutes a particular file folder that will have a particular video or image format. This could be a JPEG format, an MPEG format or any other type of video format. This is referred to as one having the extension *.VID (for generic purposes). The file format in this embodiment will have a user ID section 402, a time/date stamp section 404, a sequence number 406 and a device number 408. This will have the format of XXX.AAAA.XXX.XXX.VID. The user ID section 402 will define the user of the capture device, this typically being configuration information that is input to the system. The time/date stamp is time and date information that can be taken from an internal clock or it can be derived from some external accurate time source. The sequence number 406 is typically internally generated with a counter that represents an internal sequence that is unique to a particular capture device. However, among different capture devices, the sequence could be the same. The device section 408 is a unique device number given to a particular device. Therefore, with the user ID information, the time/date stamp, the sequence number and the device number, a very unique file number will be generated. Further, the sequence and the time/date information will be different for each file. Thereafter, the information retrieved from the GPS 218 will be disposed in a folder with an extension of, for example, *.GPS. This will be stored in the file folder 208. The file numbering will be identical to the file nomenclature other than the extension will be identical to that of the digitized video file. Similarly, the audio information will be stored in a file folder with an extension of, for example, *.WAV with the body of the file name being identical to that of the digitized video file. This will all be stored in the database 208 and then combined in a compressed folder of the *.ZIP type. The actual file name for this can be any type of file name and it does not have to be identical or unique with respect to the name. However, there should be some type of unique file name in that, a random filename could be duplicated by other capture devices. Thus, in the preferred embodiment of this disclosure, the unique body of the *.ZIP file will be identical to that associated with the files contained therein such that this will have a filename of "XXX.AAAA.XXX.XXX.ZIP." This is the file that is transmitted.

As a summary, the system of the present disclosure provides a system for capturing, storing, indexing and retrieving data objects, which can include a capture device, a storage facility and an access point. The system consists of a primary data converter, a secondary data converter, a meta data source, a data combiner and compressor, a symmetrical encryptor, a one-way hash function, an asymmetric encryptor, and a communications port. The primary data converter captures some physical phenomenon such as, but not limited to a still image, a moving image, a sound, or some other factor, into a primary data set. The secondary data converter is capable of capturing some phenomenon into a secondary data set, related to but separate from the information captured by the primary data converter. The meta data source produces a device identifier, time, date, location, and other data related to the information captured by the primary data converter into a meta data set. The source of the time, date and location information is a GPS receiver, a wireless receiver or another receiver. The source of the device identifier is a read-only memory device. The data combiner and compressor is capable of combining the output of the multiple sources of data (the primary data converter, the secondary data converter, and the meta data source) into a single data stream, and then compressing said data stream into a compressed data set such that the compressed data set requires fewer transmission or storage resources than the uncompressed stream, but remains recoverable such that the original data from the primary data converter, the secondary data converter and the meta data source can be recovered without error. The symmetrical encryptor is capable of using a key shared with another party to convert the data stream from the data combiner and compressor into a singly encrypted data set that is unusable by any party other than the party that has knowledge of the key. The one-way hash function is capable of calculating for the encrypted data stream from the symmetric encryptor a number associated with said data stream such that (a) the number represents the data stream, but the data stream is not recoverable from the number, and (b) that it is computationally infeasible to created a second data stream that, when presented to the one-way hash function, produces an identical number. The communications port is capable of sending the meta data and the hash to a second party. The communications port is further capable of receiving from a second party a certificate that has the property of (a) being uniquely and verifiably identified with the meta data and hash of claim 12, and (b) being verifiably identified as originating with the second party. The asymmetric encryptor is capable of converting the output of the symmetric encryptor and other data into an encrypted information packet that can be read only by a specific second party by means of a pair of related but non-identical keys, the encryption key and the decryption key. The communications port is further capable of conveying the encrypted information packet to a second party. The storage facility consists of a communications port, a device authenticator, an asymmetric decryptor, a validator, a symmetric decryptor, a data expander and recovery device, a tag generator, a mass storage mechanism, an asymmetric encryptor, and a user authenticator. The communications port is capable of receiving a request from validation from the capture device. The device authenticator is capable of verifying that the capture device is authorized to use the storage facility and to create an authentication certificate such that (a) it is computationally infeasible to create a second meta data set or hash that creates an identical authentication record, and (b) the authentication record is uniquely identified with the storage facility. The asymmetric encryptor is capable of using the decryption key to recover the authentication certificate and the singly encrypted data set. The validator is capable of determining if the recovered authentication certificate (a) was generated by the storage facility, and (b) is valid for the presented hash and meta data. The symmetric decryptor is capable of converting the singly encrypted data set into the compressed data set. The data expander and recovery device is capable of converting the compressed data set into the original primary data set, the secondary data set, and the meta data set. The tag generator is capable of taking the primary data set, the secondary data set and the meta data set and producing a set of index tags that describe the primary data set. The tag generator in which the tag generation is performed by a human operator. The tag generation is performed by a speech-to-text function or by an image recognizer. The mass storage mechanism is capable of storing the primary data set, the secondary data set and the meta data set in a way that the information can be retrieved based on the index tags. The user authenticator is capable of receiving requests from access points and verifying their authority to perform retrieval operations at the storage facility.

The system can, at its most condensed version, comprise an asymmetric encryptor capable of converting data read from the mass storage mechanism using a public encryption key into a form usable only by a party with knowledge of a secret key that corresponds to the said public encryption key. The access point consists of an asymmetric decryptor, a communications port and an authentication requester. The authentication requester is capable of identifying the access point and the data element or elements to be recovered from the storage facility in a manner that proves its authority to access said data element or elements.

What is claimed is:

1. A system for capturing image and audio information for storage in a database at a location on a network, comprising:
   a microphone interfaceable with an external audio information source that generates external audio information and a first data converter for capturing the external audio information from the microphone,
   a camera interfacing with an external image source to capture an image therefrom;
   the first data converter processing the captured external audio information and storing it in a first digital audio format as stored digital audio within the capture device, the camera for processing the captured image and storing it as a stored digital image;
   a data capture device for capturing, as captured data, location information and time information associated with at least the capture of the image and storing the captured data as stored captured data;
   a data combiner for combining the stored digital audio, stored digital image and stored captured data as a composite data set;
   an encryptor for encrypting the composite data set as an encrypted composite data set:
   a transmitter for transmitting the encrypted composite data set to the location on the network; and
   a system disposed at the location on the network and including:
      a receiver for receiving the transmitted encrypted composite data set from the transmitter, a decryptor decrypting the received encrypted composite data set as a decrypted composite data set to provide the decrypted composite data set as a received set of decrypted captured information, a system data converter for converting the received digital audio in the decrypted composite data set to a text based searchable file as a text context tag and creating an image recognition searchable context tag with image recognition of at least a portion of the digital image in the decrypted composite data set and associating the text and image recognition context tags with the digital image in the received decrypted composite data set, and the database storing the digital image in the decrypted composite data set in association with the text and image recognition context tags as a stored context based digital image and in association with the received captured data in the decrypted composite data set.

2. The system of claim 1, wherein the first data converter captures the first external audio information from the microphone during generation thereof.

3. The system of claim 1, wherein the camera captures the image from the external image source at an instant in time.

4. The system of claim 1, wherein the first data converter processes the captured external audio information from a start event representing the time that capture of the external audio information is initiated to a stop event representing the time that capture of the external audio information is complete.

5. The system of claim 4, wherein the transmitter transmits the encrypted composite data set to the location on the network after at least the stop event associated with the processing of the captured external audio information.

6. A system for capturing image and audio information for storage, comprising:
   a capture device having:
      internal storage;
      a microphone interfaceable with and external audio information source that generates external audio information and a first data converter for capturing the first external audio information from the microphone,
      a camera interfacing with and external image source to capture an image therefrom;
      the first data converter processing the captured external audio information and storing it in a first digital audio format as stored digital audio in internal storage within the capture device, the camera for processing the captured image and storing it as a stored digital image in internal storage;
      a data capture device for capturing, as captured data, location information, and time information associated with at least the capture of the image and storing the captured data as stored captured data;
      a media data converter for converting the the received digital audio to a text based searchable file as a text context tag and creating an image recognition searchable context tag with image recognition of at least a portion of the digital image and associating the text and image recognition context tags with the digital image and the captured data, and
      the internal storage storing the digital image in association with the text and image recognition context tags in addition to the stored captured data.

7. The system of claim 6, wherein the first data converter captures the first external audio information from the microphone during generation thereof.

8. The system of claim 6, wherein the camera captures the image from the external image source at an instant in time.

9. The system of claim 6, wherein the first data converter processes the captured external audio information from a start event representing the time that capture of the external audio information is initiated to a stop event representing the time that capture of the external audio information is complete.

10. The system of claim 6, and further including:
    a transmitter associated with the capture device for transmitting the composite data set to the location on the network;
    a system disposed at the location on a network and including:
       a receiver for receiving the transmitted composite data set from the transmitter associated with the capture device as a received set of captured information,
       a database, and
       the database storing the received composite data set.

11. The system of claim 10, wherein the first data converter processes the captured external audio information from a start event representing the time that capture of the external audio information is initiated to a stop event representing the time that capture of the external audio information is complete.

12. The system of claim 11, wherein the transmitter transmits the received composite data set to the location on the network after at least the stop event associated with the processing of the captured external audio information.

13. A system for capturing image and audio information for storage, comprising:
    internal storage;
    a microphone interfaceable with an external audio information source that generates external audio information and a first data converter for capturing the external audio information from the microphone;
    a camera interfacing with an image source to capture an image therefrom;
    a data capture device for capturing, as captured data, location information and time information associated with at least the capture of the image and storing the captured data as stored captured data;
    the first data converter processing the captured external audio information and storing it in a first digital audio format as stored digital audio within the capture device, the camera for processing the captured image and storing it as a stored digital image;
    a second data converter for converting the received digital audio to a text based searchable file as a text context tag and creating an image recognition searchable context tag with image recognition of at least a portion of the digital image and associating the text and image recognition context tags with the digital image and with the stored captured data; and
    the internal storage storing the digital image in association with the text and image recognition context tags in addition to the stored captured data.

14. The system of claim 13, wherein the image source is an external image source.

15. The system of claim 13, wherein the first data converter captures the first external audio information from the microphone during generation thereof.

16. The system of claim 13, wherein the camera captures the image from the image source at an instant in time.

17. The system of claim 13, wherein the first data converter processes the captured external audio information from a start event representing the time that capture of the external audio information is initiated to a stop event representing the time that capture of the external audio information is complete.

* * * * *

Disclaimer

10,237,067 B2 - Michael F. Malone, McKinney, TX (US). APPARATUS FOR PERSONAL VOICE ASSISTANT, LOCATION TAGGING, MULTI-MEDIA CAPTURE, TRANSMISSION, SPEECH TO TEXT CONVERSION, PHOTO/VIDEO IMAGE/OBJECT RECOGNITION, CREATION OF SEARCHABLE METATAG(S)/CONTEXTUAL TAG(S), STORAGE AND SEARCH RETRIEVAL. Patent dated March 19, 2019. Disclaimer filed January 24, 2023, by the inventor.

I hereby disclaim the following complete claims 1-5, of said patent.

*(Official Gazette, May 2, 2023)*